Figure 3:
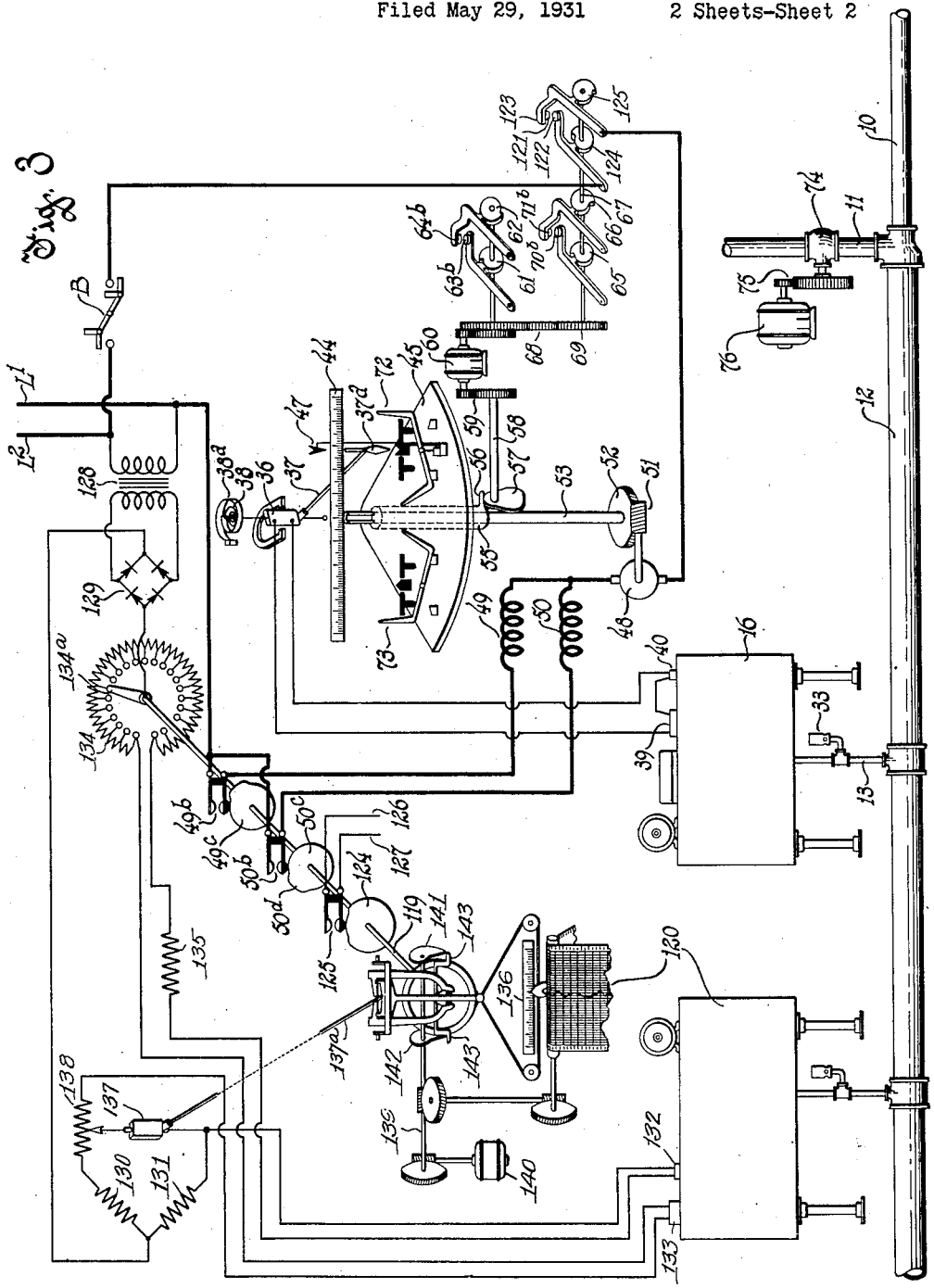

May 21, 1935. E. X. SCHMIDT 2,002,279
CALORIMETRIC METHOD AND APPARATUS ADAPTED FOR GAS MIXING CONTROL
Filed May 29, 1931 2 Sheets-Sheet 1
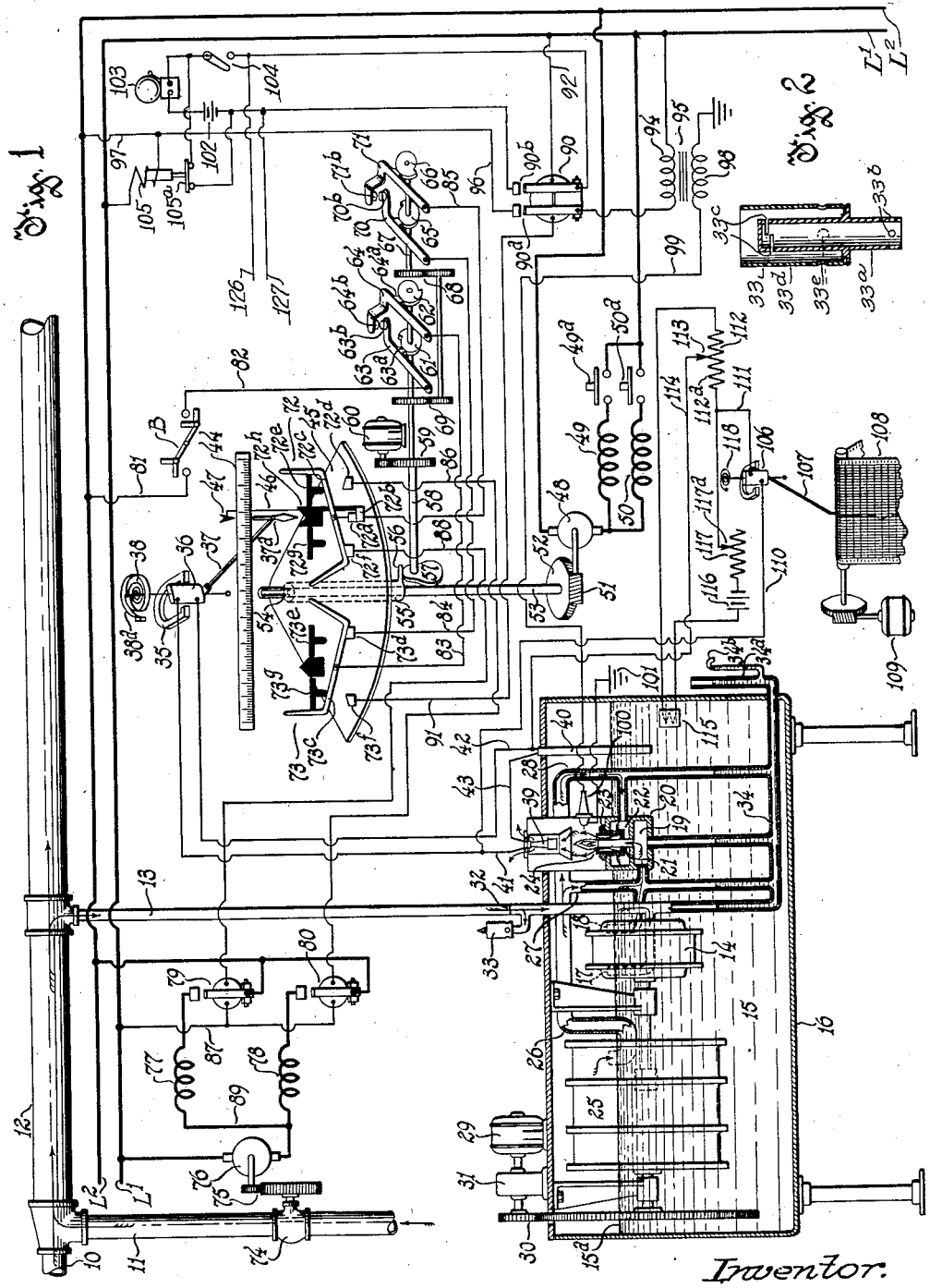
Inventor:
EDWIN X. SCHMIDT.
By Frank H. Hubbard Atty.

Patented May 21, 1935

2,002,279

UNITED STATES PATENT OFFICE 2,002,279

CALORIMETRIC METHOD AND APPARATUS ADAPTED FOR GAS MIXING CONTROL

Edwin X. Schmidt, Whitefish Bay, Wis., assignor to Cutler-Hammer, Inc., Milwaukee, Wis., a corporation of Delaware Application May 29, 1931, Serial No. 540,863

9 Claims. (Cl. 48—180)

This invention relates to improvements in calorimetric methods and apparatus, and while not limited thereto the invention relates more particularly to calorimetric methods of and apparatus for proportioning gaseous fluids.

An object of the invention is to provide novel calorimetric methods of quickly regulating and accurately controlling the relative proportionality of a plurality of flows of gaseous fluids to provide a flowing mixture of substantially constant quality or total heating value per unit volume.

Another object is to provide novel methods, in calorimetry, of compensating for the effects of variation in ambient temperature.

Another object is to provide novel forms of gas mixing control systems for carrying out the aforementioned methods.

Another object is to provide an electrically operated gas mixing control system which functions automatically under all conditions after manual initiation of operation thereof.

Another object is to provide novel means for maintaining a given volumetric proportionality of the constituent gaseous fluid flows in the event of failure of certain elements of the control system.

Another object is to provide novel forms of signaling elements to function automatically under the conditions last mentioned.

Other objects and advantages of the invention will hereinafter appear.

The accompanying drawings illustrate certain embodiments of the invention which will now be described, it being understood that the invention is susceptible of embodiment in other forms without departing from the scope of the appended claims.

In the drawings, Figure 1 is a schematic and diagrammatic illustration of a gaseous fluid mixing control system constructed in accordance with my invention.

Fig. 2 is a detail vertical sectional view of a part of the calorimetric device shown in Fig. 1, and Fig. 3 is a schematic and diagrammatic illustration of a modified form of gaseous fluid mixing control system constructed in accordance with my invention.

Referring to the drawings, the numerals 10 and 11 designate conduits through which two fluids of different quality or total heating value per unit volume are adapted to flow from any suitable sources, respectively. For example, it may be assumed that the fluid flowing through conduit 10 comprises propane gas, or other gas of relatively high quality or total heating value per unit volume, with which it is desired to mix the air or other gaseous fluid of relatively low quality or total heating value per unit volume flowing through conduit 11, for the purpose of providing a flowing mixture of gaseous fluids in conduit 12 having the desired or required quality or total heating value per unit volume.

Thus it may be assumed that the fluid in conduit 10 is subject to variations both in its rate of flow (which variations may be due to variations in the demand for or rate of flow of the mixture in conduit 12 or to variations in the rate of generation or supply of said fluid in conduit 10) and in the quality or total heating value per unit quantity of such fluid. It is therefore necessary to provide some means for automatically controlling the rate of flow of fluid through conduit 11 in order that the quality or total heating value per unit volume of the mixture of gases in conduit 12 shall be maintained substantially constant.

As will be apparent the degree to which the quality or total heating value per unit volume of the mixture of fluids in conduit 12 remains constant depends primarily upon the rapidity of change or variation in the rate of flow of fluid in conduit 11 in response to such variations in quality of the mixture in conduit 12, if it be assumed that the quality of the mixture is continuously and accurately determined. It is therefore a primary object of my invention to provide means whereby the rate of flow of fluid in conduit 11 is changed very quickly in response to any variations in quality of the mixture of fluids in conduit 12, without sacrificing the substantial degree of accuracy of the determinations of quality of the aforementioned mixture.

Accordingly, I provide means for continuously withdrawing through conduit 13 a volumetrically constant sample of the mixture of fluids flowing in conduit 12. Said means comprises a positive displacement pump 14 of well known form which operates within and is sealed by a body of liquid 15, such as water, within a tank 16. The intake of pump 14 is represented by the conduit 17 shown in dotted lines and the outlet thereof is represented by the conduit 18 shown in dotted lines. Conduit 18 leads to the preliminary mixing chamber 19 of the calorimeter burner 20, said burner having a tube or tip 21 extending upwardly through a secondary air chamber 22 and through the bottom of a pair of laterally perforated cups 23 and 24 which are rotatably adjustable relatively to each other to vary the amount of secondary air supplied to the burner.

A second positive displacement pump 25 is employed to supply air to burner 20, the outlet of pump 25 comprising a conduit 26 which is provided with branches 27 and 28, the former communicating with conduit 18 to provide a mixture of primary air and gas within chamber 19, and the latter communicating with the chamber 22 to provide a supply of secondary air to the burner. As shown the pumps 14 and 25 are driven at like speeds by means of a suitable constant speed motor 29 through suitable gearing 30, 31. The amounts of gas and air supplied by pumps 14 and 25, respectively, will therefore be proportioned in accordance with the relative capacities of said pumps. The top portion of tank 16 is vented sufficiently to provide for atmospheric pressure of the air above the level 15ᵃ of the liquid, such air being drawn into pump 25 at the left-hand side of the latter in a well known manner.

Suitable means are also preferably provided for supplying the gas sample to pump 14 at substantially atmospheric pressure; said means comprising an orifice plate 32 and a vent to atmosphere which preferably is in the form of a burner 33. This burner is shown more in detail in Fig. 2 as consisting of a tube or tip 33ᵃ having inlets 33ᵇ at the lower end thereof for primary combustion air and having lateral kerfs or slits 33ᶜ adjacent to the upper end thereof for emission of the combustible gas. A tube or jacket 33ᵈ surrounds the burner tip to protect the flame from drafts, said jacket having openings 33ᵉ therein to provide a sufficiency of secondary combustion air for the combustible mixture in the burner when ignited.

It will be apparent that due to intimate contact of the gas and air with the body of liquid 15 at substantially atmospheric pressure, said fluids are metered and proportioned under like conditions of temperature, pressure and saturation.

Suitable piping 34 may be provided for draining by gravity the condensed moisture formed in the gas and air conduits and in other parts of the calorimeter; a branch pipe 34ᵃ being provided for initial admission of a quantity of water or similar liquid to provide a seal, and a second branch pipe 34ᵇ being provided to intermittently siphon off the excess liquid of the seal. Any well known means may be provided for replenishing the liquid in tank 16 to maintain the body 15 thereof at the level 15ᵃ.

The means responsive to variations in quality or total heating value per unit quantity of the gas sample comprises essentially a galvanometer system including the usual permanent magnet 35, coil 36, and needle 37 which is biased to a normal or zero position as by means of the hairspring 38. Needle 37 is adapted to be moved from and toward the normal position thereof in accordance with the value of the E. M. F. generated in the circuit of coil 36. Included in such circuit are hot- and cold-junctions 39 and 40 of a thermo-couple; the hot-junction 39 of the thermo-couple being exposed in the burner 20 to the calorific or temperature effect of combustion of the continuous sample of gas in the presence of a proportioned quantity of air, as aforedescribed, and the cold-junction 40 of the thermo-couple being subjected to a different temperature, which is preferably the temperature of the liquid 15 in tank 16.

The hot- and cold-junctions are connected in series with each other in the usual manner, and as is well known each junction consists of two different metals. For example, wires 41 and 42 formed of iron may be joined as by welding, brazing or the like to the opposite ends of a common wire 43 formed of constantan, which is an alloy consisting of 60 per cent. copper and 40 per cent. nickel.

Associated with the needle 37 of the galvanometer is a fixed scale 44 which may be suitably calibrated in B. t. u. values to indicate the quality or total heating value per unit volume of the gaseous mixture flowing in conduit 12 through burning of said sample. Fixed to a movable table or support 45, as by means of a suitable bracket 46 is a pointer 47, whereby the quality or total heating value per unit volume of the mixture flowing in conduit 12 may be preselected. Movement of table 45 and pointer 47 may be effected in any desired manner, but I prefer to employ a split field reversible motor the armature of which is indicated at 48 and the respective fields of which are indicated at 49 and 50. Connection of armature 48 across suitable energy supply lines L¹, L² through series field 50 for operation thereof in one direction is controlled by a manually operable push button switch 50ᵃ, and connection of said armature across said lines through series field 49 for operation thereof in the reverse direction is controlled by a similar switch 49ᵃ.

Motor 48 is adapted through worm gear 51 and pinion 52 to drive a shaft 53 to which table 45 is non-rotatably keyed, as indicated at 54,—the arrangement being such that table 45 may be reciprocated longitudinally of shaft 53. The means for effecting longitudinal reciprocation of table 45 is shown more or less diagrammatically as comprising a tubular extension 55 having a lug 56 engaged by an eccentric or cam 57 which is operable through shaft 58 and gearing 59 by a motor 60 which may be connected to lines L¹, L² or to any other suitable source of energy supply for operation thereof at a predetermined constant speed. It may be assumed, for example, that cam 57 is so shaped and that motor 60 is operated at such a speed as to provide for raising table 45 to its upper extreme position once in every seven and one-half seconds.

Also connected to shaft 58 is a pair of cams 61 and 62 which are angularly adjustable relatively to each other. Cams 61 and 62 have high and low portions as shown which are adapted to engage suitable abutments or projections 63ᵃ and 64ᵃ upon a pair of contact carrying arms 63 and 64,—the contact points being shown at 63ᵇ and 64ᵇ. Cams 61 and 62 are preferably so adjusted as to effect engagement of contact points 63ᵇ, 64ᵇ upon each movement of table 45 to its upper extreme position,—it being noted that said cams 61 and 62 are capable of adjustment in a manner to vary the period of time during which said contact points 63ᵇ, 64ᵇ remain closed.

A second pair of cams 65 and 66 is carried by shaft 67, said cams being likewise adjustable with respect to each other and said shaft being driven through suitable gearing 68 and 69 from shaft 58 at a predetermined faster speed than the latter. For example, the speed of shaft 67 is preferably such that the cams 65 and 66 control arms 70 and 71 in a manner to provide for engagement of the contact points 70ᵇ and 71ᵇ carried thereby once during each period of six seconds. It will be apparent that with the adjustments aforedescribed the arrangement is such that the contact points 63ᵇ, 64ᵇ and 70ᵇ, 71ᵇ of the interrupter switches are closed simultaneously once during each period of thirty seconds, at which time the table 45 will likewise be in its supper extreme position.

Here it may be pointed out that table 45 carries two double-acting switch mechanisms 72 and 73, and the switch 72 is provided with a pair of normally closed auxiliary contacts 72$^a$, 72$^b$ which when opened are adapted to render said switch ineffective. The oscillatable contactor 72$^c$ of switch 72 is movable into engagement with stationary contact 72$^d$ through engagement of an element 72$^e$ with the part 37$^a$ of the galvanometer needle upon upward movement of table 45, and said contactor 72$^c$ is movable into engagement with stationary contact 72$^f$ through engagement of an element 72$^g$ with said part 37$^a$ upon upward movement of the table,—depending of course upon the relative position of the galvanometer needle. On the other hand, if part 37$^a$ of the needle is directly above the element 72$^h$ upon upward movement of table 45 contact 72$^b$ carried by said element will be moved out of engagement with contact 72$^a$ to disable switch 72. Hence if the contacts 63$^b$, 64$^b$ and 70$^b$, 71$^b$ of the interrupter switches happen to be closed at that instant the circuit through said interrupter contacts will be incomplete due to opening of said auxiliary contacts 72$^a$, 72$^b$ of switch 72.

The oscillatable contactor 73$^c$ is adapted to be engaged with the contact 73$^d$ when needle 37 is positioned at the right-hand side of switch 73 as shown in the drawing,—such engagement being effected by engagement of an element 73$^e$ with part 37$^a$ of the galvanometer needle upon upward movement of table 45. In the event of extinguishment of the burner flame from any cause, or upon failure of the thermo-couple circuit such as to result in deenergization of coil 36, the needle 37 will move under the bias of spring 38 toward its left-hand position, and upon raising of table 45 the contactor 73$^c$ is tilted into engagement with contact 73$^f$ by engagement of an element 73$^g$ with the part 37$^a$ of the needle 37.

The means for controlling the volumetric rate of flow of fluid through conduit 11 comprises a valve of suitable form located at the point 74, said valve being operable in reverse directions selectively through the medium of gearing 75 and a split-field reversible motor, the armature of which is indicated at 76 and the fields of which are indicated at 77 and 78. Energization of field 77 to cause operation of motor 76 in a direction to effect closing movement of valve 74 results from closure of a normally open electromagnetically operable switch 79, energization of the operating winding of the latter switch being dependent upon simultaneous closure of contacts 72$^f$, 72$^c$ and 72$^a$, 72$^b$ of switch 72 and contacts 63$^b$, 64$^b$ and 70$^b$, 71$^b$ of the interrupter switches. Energization of field 78 to cause operation of motor 76 in the reverse direction to effect opening movement of valve 74 results from closure of a similar normally open electromagnetically operable switch 80, energization of the operating winding of the latter switch being dependent upon simultaneous closure of contacts 72$^c$, 72$^d$ and 72$^a$, 72$^b$ of switch 72 and contacts 63$^b$, 64$^b$ and 70$^b$, 71$^b$ of the interrupter switches.

More particularly, if it be assumed that the quality or heating value per unit volume of the mixture of fluids flowing in conduit 12 has risen above the value preselected therefor by the adjustment of table 45 as indicated by the position of pointer 47, the part 37$^a$ of needle 37 will have been moved toward the right to overlie the element 72$^e$ of switch 72,—due to the increased value of the electromotive force generated in the circuit of coil 36 by the richer quality of the gas sample burned in the presence of the hot-junction 39 of the thermo-couple.

Therefore when table 45 is lifted by the means aforedescribed element 72$^e$ will be engaged by part 37$^a$ of the needle to effect tilting of contactor 72$^c$ into engagement with contact 72$^d$. Thereafter within a maximum period of thirty seconds the contacts of both interrupter switches will be simultaneously closed, and, assuming prior closure of a manually operable push-button switch B, an energizing circuit for the winding of switch 80 will be completed. Said circuit may be traced from line L$^2$ by conductor 81 through switch B, conductor 82 through contacts 63$^b$, 64$^b$ of one of the interrupter switches, conductor 83 to and through contactor 73$^c$ and contact 73$^d$ of switch 73, conductor 84 through contacts 70$^b$, 71$^b$ of the other interrupter, conductor 85 to and through auxiliary contacts 72$^b$, 72$^a$, contactor 72$^c$ and contact 72$^d$ of switch 72, conductor 86 to and through the winding of switch 80, and by conductor 87 to line L$^1$.

Consequent closure of switch 80 completes a circuit for operation of motor 76 in a direction to effect opening movement of valve 74, which circuit may be traced from line L$^1$ through the armature 76 of said motor, thence through field 78 and the contacts of switch 80 to line L$^2$. The duration of operation of motor 76 in such direction is dependent upon the period of joint closure of contacts 63$^b$, 64$^b$ and 70$^b$, 71$^b$ of the interrupter switches,—which period as aforestated may be varied by adjustment of cams 61, 62 and 65, 66.

If the single adjustment of valve 74 thus effected is sufficient to bring the quality of the mixture of fluids in conduit 12 to the value preselected by the positioning of pointer 47 the part 37$^a$ of needle 37 will have been moved to a position overlying the element 72$^h$ within the succeeding period of thirty seconds, so that simultaneous closure of contacts 63$^b$, 64$^b$ and 70$^b$, 71$^b$ will have no effect, due to coincident opening of the auxiliary contacts 72$^a$, 72$^b$ of switch 72.

If the quality of the mixture in conduit 12 thereafter falls below the value preselected by the adjustment of table 45, the value of the electromotive force generated in the circuit of coil 36 will be decreased and part 37$^a$ of needle 37 will move toward the left to overlie element 72$^g$. Therefore upon raising of table 45 contactor 72$^c$ will be tilted into engagement with contact 72$^f$, and upon simultaneous closure of the interrupter contacts 63$^b$, 64$^b$ and 70$^b$, 71$^b$ an energizing circuit will be completed for the winding of switch 79, said circuit extending from line L$^2$ through switch B, interrupter contacts 63$^b$, 64$^b$, contacts 73$^c$, 73$^d$ of switch 73, thence through interrupter contacts 70$^b$, 71$^b$ and through auxiliary contacts 72$^b$, 72$^a$ and contacts 72$^c$, 72$^f$ of switch 72, by conductor 88 through the winding of switch 79, and by conductor 87 to line L$^1$. Consequent closure of switch 79 completes a circuit for motor 76 to cause closing movement of valve 74, said circuit extending from line L$^1$ through the armature of said motor 76, by conductor 89 through field 77, and through the contacts of switch 79 to line L$^2$. If the single adjustment of valve 74 thus effected is insufficient to bring the quality of the mixture in conduit 12 to the preselected value, an additional adjustment of said valve in the same direction will be effected at the end of the next succeeding period of thirty seconds, as aforedescribed. By the means aforedescribed the valve 74 is automatically adjusted in the required direction upon either an increase or decrease in the total heating value per unit volume of the mixture flowing in conduit 12, whereas if such value remains unchanged the auxiliary contacts 72$^a$, 72$^b$ of switch 72 are operative to prevent any adjustment of said valve. The thermo-couple device herein disclosed is extremely sensitive to variations in the total heating value per unit volume of the gas sample and the galvanometer is therefore quickly responsive to such variations. Hence the provision of means for simultaneously closing the contacts of both interrupter switches at predetermined time intervals is desirable merely to prevent "hunting" of the control mechanism; but as will be understood such time intervals may be varied as desired to suit the requirements of each particular installation.

Obviously if the flame of burner 20 is extinguished for any reason, or if the circuit of coil 36 of the galvanometer is broken, as by failure of the hot-junction or cold-junction of the thermo-couple, the resulting decrease or failure of current in coil 36 will permit needle 37 to move quite rapidly, under the bias of spring 38, toward its left-hand position. Part 37$^a$ of the needle will then overlie element 73$^p$ of switch 73, and upon raising of table 45 the contactor 73$^c$ will be moved into engagement with contact 73$^f$. At the same time, as aforedescribed, the interrupter contacts 63$^b$, 64$^b$ will be closed to complete a circuit for the winding of an electromagnetically operable switch 90, said circuit extending from line L$^2$ through switch B and interrupter contacts 63$^b$, 64$^b$, conductor 83 to and through contactor 73$^c$ and contact 73$^f$ of switch 73, conductor 91 through the winding of switch 90, and by conductor 92 to line L$^1$.

Closure of switch 90 completes a circuit which may be traced from line L$^1$ through the primary winding 94 of a well known form of spark-coil, designated in general by the numeral 95, thence through the left-hand contacts 90$^a$ of said switch, and by conductors 96 and 97 to line L$^2$. The secondary winding 98 is grounded at one end and the other end thereof is connected by conductor 99 with a spark-plug or spark-gap element 100 of usual form, which is grounded as indicated at 101. The intermittent sparking at plug 100 tends to re-ignite the stream of gas at the tip of burner 20, and if extinguishment of the burner flame was the sole trouble, the several parts of the control device will be automatically returned to the normal positions occupied thereby prior to failure of the burner. In this connection it should be noted that due to the relatively quick movement of needle 37 toward its left-hand position upon failure of the burner, the contactor 73$^c$ is so quickly disengaged from contact 73$^d$ of switch 73 as to prevent any improper adjustment of valve 74 through closure of switch 79 at such time, inasmuch as continuity of the circuit through interrupter contacts 70$^b$, 71$^b$ is broken upon the aforementioned disengagement of contactor 73$^c$ from contact 73$^d$. The quality of the mixture flowing through conduit 12 will therefore not be substantially affected by temporary failure of the burner 20 or by failure of the thermo-couple circuit pending correction of the fault, as by substitution of a new hot-junction element.

The right-hand contacts 90$^b$ of switch 90 when closed complete a circuit from battery 102 through a bell-ringer 103 or any other audible or visual warning or indicating element,—a manually operable switch 104 being provided which is adapted to be closed when the operation of the control system as a whole is initiated.

Means are also preferably provided for sounding the alarm bell 103 upon failure of voltage in the energy supply lines L$^1$, L$^2$; said means, as shown, comprising a relay 105 having its winding connected across said lines L$^1$, L$^2$ to normally interrupt the circuit through contacts 105$^a$ thereof, which when closed provide a circuit shunting the contacts 90$^b$ of switch 90.

As will be understood by those skilled in the art, a given increase in temperature of the liquid 15 in tank 16 will result in a known decrease in the total heating value per unit volume of the gas supplied to burner 20. This phenomenon is principally explained by the fact that at the higher temperature an increased amount of water vapor is present in each unit volume of combustible gas and hence a correspondingly reduced number of potential heat units will be present in such unit volume. For instance the number of heat units in a unit volume of the gas will be decreased to the extent of approximately two and one-half per cent for a temerature increase of, say, 20 degrees F. at ordinary operating temperatures. In order to compensate for such variations in tank temperature, I prefer to employ a coiled bimetallic thermostatic strip 38$^a$ as a support for the hair-spring 38 of the galvanometer. The compensation thus effected amounts to approximately two and one-half per cent in a rise in tank temperature of, say, 20 degrees F., and hence materially increases the accuracy of the control system. Stated another way, the effect of the bimetallic support 38$^a$ is to move the zero position of the needle 37 in accordance with and to compensate for changes in tank temperature. While the showing herein is diagrammatic it is to be understood that in practice the bimetallic strip will be so positioned with respect to the liquid in tank 16 as to be definitely subjected to the variable temperature of the latter.

Any suitable means may be provided for recording the movements or variations in position of the galvanometer needle 37. I have shown herein, by way of example a recording device which is auxiliary to or additional to the aforedescribed galvanometer parts. Thus I may employ a galvanometer 106 of usual form having a recording pen or element 107 for cooperation with a known form of chart 108 which is movable at a constant relatively slow speed by the motor 109, which may be connected with any suitable source of energy supply, such as lines L$^1$, L$^2$. The left-hand side of the coil of galvanometer 106 is connected by conductor 110 with the lead wire 41 of the hot-junction 39 of the thermo-couple, and the right-hand side of said coil is connected by conductor 111 through a selectable portion 112$^a$ of a resistance element 112, which is not affected by temperature changes, and through slider 113 and conductor 114 to the lead wire 42 of the cold-junction 40 of the thermo-couple,—slider 113 being adjustable to provide for zero positioning of pen 107 when the needle 37 of the other galvanometer is at the position preselected therefor by the setting of pointer 47.

The coil of galvanometer 106 is thus connected in circuit in series with the hot- and cold-junctions of the thermo-couple in substantially the same manner as coil 36 aforedescribed. In order to compensate for variations in tank temperature I supply to the circuit including the fixed resistance 112 and an element 115 having a positive temperature-resistance coefficient a source of substantially constant voltage. Element 115 is so located as to be subjected to the variations in temperature of tank liquid 15. Said source may comprise a battery 116, which preferably has associated therewith a resistance 117, said resistance 117 being manually adjustable by means of a contactor 117ᵃ to compensate for gradual weakening of the battery. The coil circuit of galvanometer 106 as thus connected is subjected to the effect of variations in voltage drop across the portion 112ᵃ of resistance 112, which variations are in turn due to variations in the resistance value of element 115 as an incident to variations in the temperature of the tank liquid 15. The resistance values of elements 112 and 115 and the value of the electromotive force supplied from battery 116 will be chosen to give the desired decrease in electromotive force of two and one-half per cent for each twenty degrees increase in temperature of liquid 15. The chart 108 may be calibrated for direct and continuous indication and recordation of the instantaneous total heating value per unit volume of the fluid flowing in conduit 12; or said chart may be so calibrated as to provide an intermediate "zero" marking corresponding to the total heating value per unit volume preselected by the setting of pointer 47 aforementioned, with percentage calibrations on each side of the "zero" marking, to indicate and record the percentage variations of such total heating value per unit volume with respect to the value so preselected.

The galvanometer 106 is provided with the usual hair-spring 118 to bias the needle 107 to its normal or "zero" position. From the foregoing description it will be apparent that either the mechanical means comprising the bimetallic strip for supporting the hair-spring of the galvanometer, or the electrical means comprising the potentiometer connection of the circuit containing the temperature responsive resistance 115 and the fixed resistance 112 with respect to the coil circuit of the galvanometer, may be employed to effect the desired compensation for variations in temperature of the tank liquid 15,—the two arrangements illustrated being substantially equivalent in function.

The mixing control system aforedescribed is extremely sensitive to variations in the quality or total heating value of the fluid the constituency of which it is desired to control, and the elements thereof are operable quickly and automatically to vary the rate of flow of one of the constituents of the mixture to maintain the quality thereof substantially constant. In practice it has been found that this quick-acting mixing control system will automatically maintain the mixed gas within two per cent of the desired or preselected value over fairly long periods without manual checking. If closer accuracy and continuous automatic checking are desired a precision calorimeter of the character disclosed in the Packard Patent No. 1,625,277, dated April 19, 1927, may be readily combined with the aforedescribed control system without in any way interfering with the rapid response and operation of the latter. By employment of a quick-acting mixing control system of the type herein disclosed in combination with a relatively slower acting precision calorimeter of the character disclosed in said Packard patent, automatic maintenance of the mixed gas at well within one per cent of the desired or preselected value is effected over long periods of time, while at the same time eliminating the necessity for any manual operations or corrections.

Such a combination of elements is illustrated more or less diagrammatically in Fig. 3, wherein the quick-acting mixing control system aforedescribed may be used in its entirety. Identical parts have been given like characters of reference in Figs. 1 and 3 and certain of the circuit connections have been omitted in the latter figure merely for simplicity of illustration. The essential difference in the quick-acting control system in Fig. 3 is that instead of controlling energization of fields 49 and 50 manually (as by means of the push-button switches 49ᵃ, 50ᵃ of Fig. 1), energization thereof is subject to control automatically as by means of normally open switches 49ᵇ, 50ᵇ, closure of which is respectively effected by means of cams 49ᶜ, 50ᶜ carried by the oscillatable shaft 119, movement of which is controlled in a well known manner in response to variations in the quality or total heating value per unit volume of the gas mixture flowing in conduit 12, as determined by the relatively slow acting precision calorimeter, designated in general by the numeral 120. Said calorimeter, as aforestated, is preferably of the character disclosed in said Packard Patent No. 1,625,277.

Here as in said Packard Patent No. 1,625,277 the calorimeter 120 has associated therewith a Wheatstone bridge circuit, of which the resistances 130 and 131 form two fixed arms, the inlet and outlet thermometer resistances designated by the numerals 132 and 133 forming in conjunction with the balancing resistance or rheostat 134 the other two arms of the bridge circuit. Included in circuit in series with the thermometer resistance 132 is a fixed resistance 135 the resistance value of which is equal to that of resistance 134. The purpose of this resistance 135 is to bring the Wheatstone bridge circuit into balance when the contactor 134ᵃ is moved in a counterclockwise direction to one extreme position thereof which corresponds with the left-hand end of scale 136; or, in other words, when no heat is being imparted to the flow of cooling fluid between thermometer resistances 132 and 133.

The coil 137 is connected across the bridge circuit through the medium of a variable resistance 138 whereby the bridge circuit may be initially balanced. The needle 137ᵃ of the galvanometer is cooperable with ratcheting means of the character disclosed in Leeds Patent No. 1,125,699, dated January 19, 1915. The arrangement is such that shaft 119 will be oscillated or rotated in one direction or the other upon deflection of the galvanometer needle 137ᵃ to one side or the other of its neutral position. Said ratcheting means is described in detail in the aforementioned Leeds patent, but it may be pointed out that the same comprises essentially a shaft 139 to be driven unidirectionally at a constant speed by a motor 140, shaft 139 having spaced cams 141 and 142 attached thereto for cooperation with members 143 which are respectively arranged to drive shaft 119 (through a friction clutch mechanism) in one direction or the other, depending upon the direction in which needle 137ᵃ has been deflected,—it being understood that no movement of shaft 119 is effected so long as needle 137ᵃ remains in its intermediate or neutral position.

The cams 49ᶜ, 50ᶜ are adjustable upon shaft 119 to correspond with the preselected quality or total heating value per unit volume at which it is desired to maintain the mixture of fluids flowing in conduit 12. Thus if it be assumed that the total heating value per unit volume of the fluid in conduit 12 rises slightly above the value preselected therefor by the setting of table 45 and pointer 47 without proper response of the aforedescribed quick-acting mixing control elements, this means that the calibration of the latter elements is not entirely accurate or has been disturbed by some means. Accordingly the cam 50$^c$ will be moved automatically in a clockwise direction so that the high portion 50$^d$ thereof will engage and effect closure of switch contacts 50$^b$. Closure of contacts 50$^b$ will pre-set an energizing circuit for winding 50 to be completed upon closure of the normally open contacts 121, 122 of an interrupter switch 123,—closure of said contacts being effected periodically through the medium of adjustable cams 124, 125 carried by shaft 67. Field 50 when thus energized will cause operation of motor 48 to properly adjust the table 45 and its associated parts whereby the quick-acting mixing control elements will function more accurately for control of the total heating value per unit volume of the fluid mixture in conduit 12.

In a like manner any slight decrease in the total heating value per unit volume of the gas mixture which is not quickly and accurately corrected by the quick-acting elements will result in movement of cam 49$^c$ in a counterclockwise direction to pre-set the circuit of winding 49 for completion upon closure of the aforementioned interrupter contacts 121, 122. Motor 48 will therefore be operated in a reverse direction to correct the setting of table 45 and its associated parts.

Shaft 119 is preferably provided with an additional cam 124 which is shaped as illustrated to provide for automatic closure of a pair of contacts 125 when the total heating value per unit volume (as determined by the precision calorimeter 120) increases or decreases to a substantial degree from the value preselected therefor. Contacts 125 are respectively connected through conductors 126, 127 (see Figs. 3 and 1) across the circuit of battery 102 and bell 103 in shunt to the contacts 90$^b$ of switch 90, whereby the bell will be sounded to warn the attendant of the existing condition.

The precision calorimeter 120 shown in Fig. 3 may be supplied with energy from any suitable source of direct current. As shown herein, however, it is assumed that lines L$^1$, L$^2$ are supplied from a suitable alternating current source. Accordingly suitable means such as the transformer 128 and rectifier elements 129 are employed to provide a proper current supply for said calorimeter. The other elements of calorimeter 120 and the manner of operation thereof are disclosed in the aforementioned Packard patent or are well understood by those skilled in the art.

I do not claim herein broadly the idea of controlling the constituency of a mixture of gaseous fluids in accordance with the determinations of a quick-acting calorimetric device, which calorimetric device is subject to monitoring or supervisory control in accordance with the determinations of a relatively slow acting calorimetric device of the precision type, as that subject matter is disclosed and claimed in Patent No. 1,686,751, issued under date of October 9, 1928 to U. O. Hutton and myself. I do claim the idea of providing a quick-acting calorimetric device which in itself is adapted to function accurately independently of, or to compensate for, variations in temperature, pressure and saturation conditions of the fluid mixture being tested; whether said quick-acting calorimetric device is used alone or in conjunction with a relatively slow acting calorimetric device of the precision type to modify the control characteristics of the former.

What I claim as new and desire to secure by Letters Patent is:

1. The method of regulating the volumetric proportionality of a plurality of flows of gaseous fluids to provide a gaseous mixture of substantially constant total heating value per unit volume which consists in effecting a flowing mixture of said fluids, continuously withdrawing and burning a volumetrically constant sample of said mixture to determine the instantaneous total heating value per unit volume thereof, automatically regulating the volumetric proportionality of said flows of fluids relatively to each other in accordance with the determinations so effected, and automatically discontinuing such regulation and giving an audible signal when the total heating value per unit volume of said mixture varies to a given degree with respect to a preselected value.

2. In a quick-acting calorimetric device, in combination, a burner, means for continuously supplying to said burner under like conditions of temperature, pressure and saturation constant volumetrically proportioned flows of test gas and air to support combustion of said test gas, a galvanometer, a thermo-couple havng hot- and cold-junctions, a circuit connecting said galvanometer to said junctions, the hot-junction only of said thermo-couple being subjected to the thermal effect of combustion of said flows of gas and air whereby an electromotive force proportional to the total heating value per unit volume of said gas is generated in the circuit, and means controlled by said galvanometer for directly and continuously indicating the instantaneous total heating value per unit volume of said gas.

3. In a quick acting calorimetric device, in combination, a burner, means for continuously supplying to said burner under like conditions of temperature, pressure and saturation constant volumetrically proportional flows of test gas and combustion air, said means comprising a pair of positive displacement pumps, a container, said container having therein a body of liquid within which said pumps are partly submerged, a thermo-couple having the cold-junction thereof subjected to the temperature of said liquid and having the hot-junction thereof subjected to the temperature of the burning flows of test gas and air, a galvanometer, a circuit connecting said galvanometer to said junctions whereby said galvanometer is supplied with an electromotive force directly proportional to the instantaneous total heating value per unit volume of said test gas, and means controlled by said galvanometer for varying the constituency of said test gas whereby the total heating value per unit volume thereof is maintained substantially constant.

4. In a quick acting calorimetric device, in combination, a burner, means for continuously supplying to said burner under like conditions of temperature, pressure and saturation constant volumetrically proportioned flows of test gas and combustion air, said means comprising a pair of positive displacement pumps, a container, said container having therein a body of liquid within which said pumps are partly submerged, a thermo-couple having the cold-junction thereof subjected to the temperature of said liquid and having the hot-junction thereof subjected to the temperature of the burning flows of test gas and air, a galvanometer, a circuit connecting said galvanometer to said junctions whereby said galvanometer is supplied with an electromotive force directly proportional to the instantaneous total heating value per unit volume of said test gas, means controlled by said galvanometer for varying the constituency of said test gas whereby the total heating value per unit volume thereof is maintained substantially constant, and thermally responsive means operatively associated with said galvanometer and subjected to a temperature substantially corresponding to the temperature of said liquid, said means being adapted to modify the controlling effect of said galvanometer in accordance with and to compensate for variations in the temperature of said liquid with respect to a given value.

5. In a gas mixing control system, in combination, means providing a plurality of flows of gaseous fluids and means for effecting a mixture of said gaseous fluids, a quick-acting calorimetric device including a burner, means to supply to the burner constantly proportioned volumes of the aforementioned gaseous mixture and combustion air under like conditions of temperature, pressure and saturation, a thermo-couple arranged to be subjected to the calorific effect of the combustion, a galvanometer, and a circuit connecting said galvanometer to said thermo-couple whereby the former is subjected to the electromotive force generated in the latter, means including a power-operated valve controlled by said galvanometer for varying the proportionality of said flows of fluids in accordance with and to compensate for variations in the total heating value per unit volume of said mixture with respect to a preselected value; and means comprising a bimetallic element for supporting a part of said galvanometer, said element being arranged and calibrated in a manner to accurately compensate for variations in the apparent total heating value per unit volume of the gaseous mixture supplied to the burner as an incident to variations in temperature of said mixture prior to burning of the latter.

6. In a gas mixing control system, in combination, means providing a plurality of flows of gaseous fluids and means for effecting a mixture of said gaseous fluids, a quick-acting calorimetric device including a burner, means to supply to the burner constantly proportioned volumes of the aforementioned gaseous mixture and combustion air under like conditions of temperature, pressure and saturation, a thermo-couple arranged to be subjected to the calorific effect of the combustion, a galvanometer, a circuit connecting said galvanometer to said thermo-couple whereby the former is subjected to the electromotive force generated in the latter, means including a power-operated valve controlled by said galvanometer for varying the proportionality of said flows of fluids in accordance with and to compensate for variations in the total heating value per unit volume of said mixture with respect to a preselected value, and associated means for modifying the controlling effect of said galvanometer to compensate for possible error in the determinations of said quick-acting calorimetric device, said means comprising a slow-acting calorimetric device of the precision type, said last-mentioned calorimetric device being also adapted to burn a continuous sample of said gaseous mixture.

7. In a gas mixing control system, in combination, means providing a plurality of flows of gaseous fluids, power-driven means operable automatically to vary the proportionality of said flows of fluids whereby a flowing mixture of said fluids of substantially constant total heating value per unit volume is provided, and control means for said power-driven means, said control means including a plurality of circuit interrupting elements respectively operated at unlike speeds and tending jointly to effect periodic operations of said power driven means, certain of said interrupting elements being adapted to function individually under given conditions for the performance of other controlling functions.

8. In a gas mixing control system, in combination, means providing a plurality of flows of gaseous fluids of unlike total heating value per unit volume, means for proportioning said flows to provide a gaseous mixture of substantially constant preselected total heating value per unit volume, said means comprising a calorimetric device having a burner, means to supply to the burner constantly proportioned volumes of the gaseous mixture and combustion air, a thermo-couple arranged to be subjected to the calorific effect of the combustion, a galvanometer, a circuit connecting said galvanometer to such thermo-couple whereby the former is subjected to the electromotive force generated in the latter, means controlled by said galvanometer for indicating the instantaneous total heating value per unit volume of said mixture, and means for modifying the operation of said galvanometer in accordance with and to compensate for variations in the apparent total heating value per unit volume of the mixture supplied to the burner as an incident to variations in the temperature thereof, said means comprising an element having a positive temperature-resistance coefficient to be subjected to such temperature variations, a second element having a fixed resistance value, a source of electrical energy of substantially constant potential, means for connecting said elements in series with each other and in circuit with said source, and additional circuit connections whereby said galvanometer is subjected to variations in the potential drop across a portion of said second-mentioned element.

9. In a gas mixing control system, the combination with means providing a plurality of flows of gaseous fluids of unlike total heating value per unit volume, of means for effecting a mixture of said fluids, calorimetric means, including a burner, for withdrawing and burning a continuous sample of said mixture to ascertain the instantaneous total heating value per unit volume of the latter, means including an electrically operated valve subject to control by said calorimetric means and operable automatically in response to variations in the ascertained value with respect to a preselected value for varying the volumetric proportionality of said flows of fluids whereby the total heating value per unit volume of the mixture is maintained substantially constant, means including an electromagnetically operable relay associated with said calorimetric means and adapted to be energized by the latter only upon extinguishment of the burner flame, and means associated with said relay and operable upon energization of the latter to provide for re-ignition of the sample of said mixture.

EDWIN X. SCHMIDT.